Patented May 5, 1925.

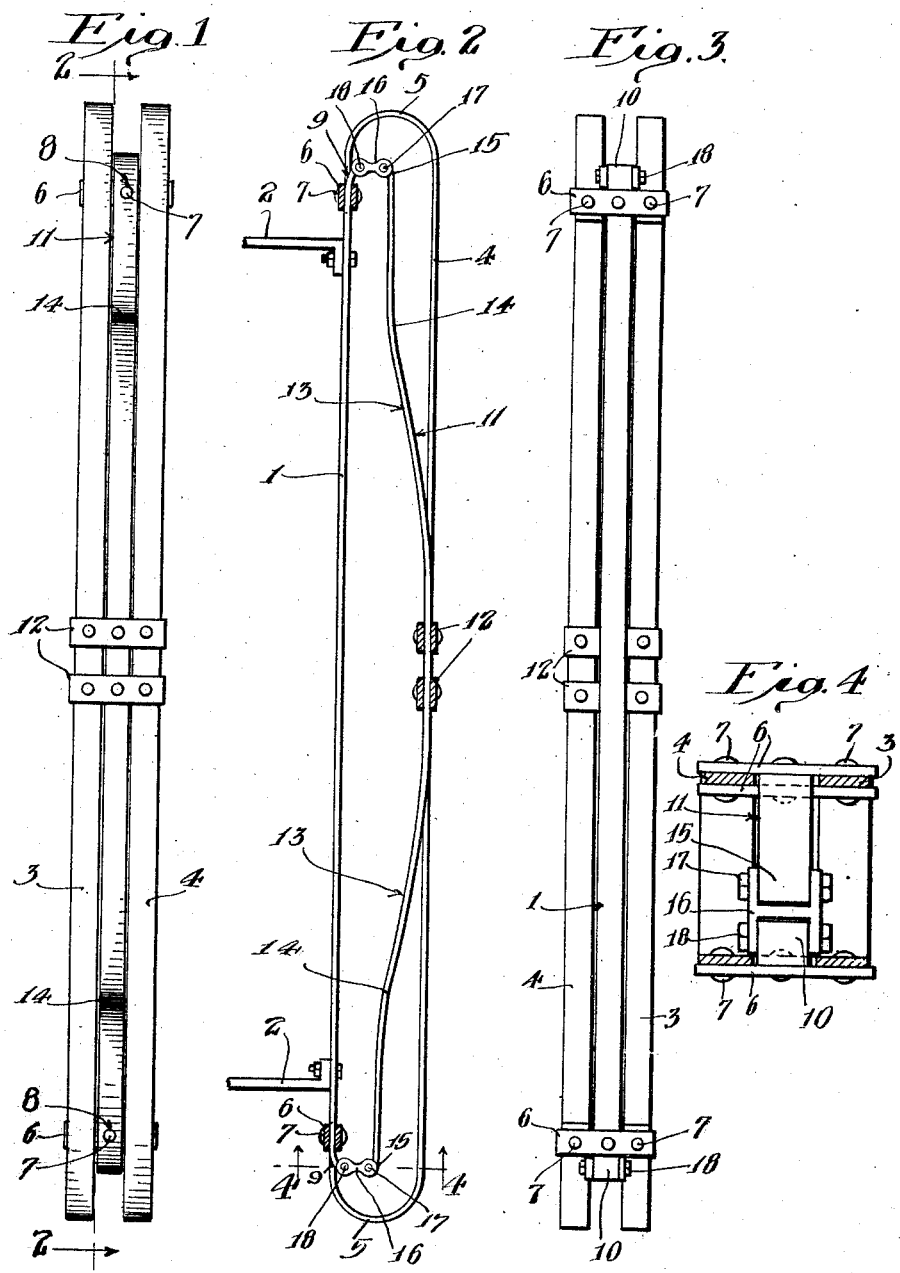

1,536,269

UNITED STATES PATENT OFFICE.

ANDREW PHILLIP RIEDELE, OF LOS ANGELES, CALIFORNIA, ASSIGNOR TO UNITED STATES BUMPER COMPANY, INC., OF LOS ANGELES, CALIFORNIA, A CORPORATION OF CALIFORNIA.

BUMPER.

Application filed December 6, 1924. Serial No. 754,259.

*To all whom it may concern:*

Be it known that I, ANDREW PHILLIP RIEDELE, a citizen of the United States, residing at Los Angeles, in the county of Los Angeles, State of California, have invented a new and useful Bumper, of which the following is a specification.

This invention relates to bumpers for use on vehicles and is more particularly directed to a bumper having a plurality of forward spring impact members resiliently supported at their ends and resiliently braced at their center.

Bumpers as now commonly constructed are for the most part weak at their central portion so that a quick impact at or near the center results in the forward impact members being damaged. It is therefore an object of this invention to provide a bumper in which the forward or impact members of the bumper are substantially equally braced at their ends and central portions so that the impact section of the bumper will be of substantially equal strength and resiliency throughout its length.

Other objects and advantages of this invention will be apparent from the following detailed description of a preferred embodiment thereof as illustrated in the accompanying drawing.

In the drawing:

Fig. 1 is a front elevational view of a bumper embodying this invention.

Fig. 2 is a sectional plan thereof taken substantially on line 2—2 of Fig. 1.

Fig. 3 is a rear elevational view thereof.

Fig. 4 is a sectional end elevation taken substantially on the line 4—4 of Fig. 2.

In the drawing, 1 indicates a rear cross bar preferably of spring steel and adapted to be secured to brackets 2—2 for securing the bumper to the frame or other suitable point or points of a vehicle, chassis or body. A plurality of forward spaced impact bars 3 and 4, preferably of spring steel and being curved rearwardly upon themselves as illustrated at 5—5 are secured to the clamps 6—6 by any suitable means, such as the bolts 7. The rear bar 1 is secured to the clamps 6—6 as illustrated at 8, preferably at a point spaced from its ends, which ends are preferably curved forward as illustrated at 9—9, and form eyes 10—10. The forward spaced bars 3 and 4 being curved rearwardly upon themselves prevent the bumper from being hooked from the rear and torn from the vehicle as often occurs with the use of bumpers as heretofore constructed.

A third or intermediate brace bar 11 is secured at a point or points near its center to and between the spaced impact bars 3 and 4 by any suitable means such as the clamps 12 illustrated. The bar 11 curves rearwardly from the clamps 12 on each side thereof as illustrated at 13—13 preferably to points 14—14 near the ends thereof, where the bar 11 is extended longitudinally to its ends, which ends are bent upon themselves to form eyes 15—15.

Means are provided for pivotally securing the eyes 15 to the eyes 10 so that the bar 11 will be free to extend in length when the impact bars 3 and 4 are engaged to force the same rearward toward the rear bar 1, which means are illustrated as comprising a spring shackle 16 of the ordinary construction, and pivotally attached to the eye 15 by a bolt 17 and to the eye 10 by a bolt 18.

It will therefore be apparent that the bar 11, of any suitable spring material, functions as a spring in reinforcing the impact bars 3 and 4 and that an impact on the bars 3 and 4 at any point along the length of said bars 3 and 4 is resisted by the combined actions of the curved ends 5—5 of the said bars 3 and 4 and by the resilient spring bar 11 which will tend to return the said bars 3 and 4 to their normal forward position and that the said bar 11 greatly increases the resiliency of the whole bumper structure in that the same is free at its ends to be compressed from its normal position which it immediately resumes on removal of the pressure on the impact bars 3 and 4, and that the bar 11 and its holding brackets are never subjected to extreme shearing force as is the case where the ends are rigidly secured.

Having fully described a preferred embodiment of this invention it is to be understood that it is not intended that this invention should be limited to the exact construction herein set forth which may obviously be varied in detail without departing from the spirit of the appended claims.

I claim:

1. A bumper comprising a plurality of spaced impact bars, a rear supporting bar, an intermediate bar secured to the rear bar at its ends in a manner to allow longitudinal movement of the ends of said intermediate bar.

2. A bumper comprising a forward impact section, a rear supporting bar means for connecting the impact section to the rear bar, a bar spaced intermediate the said rear bar and impact sections and means for securing the ends of said intermediate bar to the said rear bar in a manner to allow longitudinal movement of the ends of said intermediate bar.

3. A bumper comprising a forward impact section, a rear support member, means for connecting said impact section to said rear support, said means comprising rigid clamps, a bar spaced intermediate the said rear support and said impact section and means for securing the ends of the intermediate bar to the said rear bar in a manner to allow longitudinal motion of the ends of said intermediate bar.

4. A bumper comprising rear and forward members, rigid clamps securing said members together, means positioned intermediate said rear and forward members to resiliently absorb an impact shock, said means being secured by shackle bolts to the said members in a manner to permit longitudinal movement.

5. A bumper comprising a forward impact section, a rearward support and an intermediate resilient member secured to the impact section intermediate its ends and secured to the said rear member at its ends in a manner to permit longitudinal movement.

6. A bumper comprising a forward impact section curved rearwardly to form a loop with a rear supporting member rigidly clamped to said impact section at the ends thereof, an intermediate spring member secured to the said members at a point near their union in a manner to permit longitudinal movement of said intermediate member.

7. A bumper comprising a forward impact section curved rearwardly to form a loop with a rear supporting member rigidly clamped to said impact member, an intermediate spring member secured at a point near the center of the forward side of the loop and secured at points near the ends of the rearward side of the loop at its ends by means of shackle bolts so as to permit freedom of longitudinal movement of said spring member when compressed.

8. A spring bar bumper comprising a plurality of spaced impact members bent rearwardly to form a loop with a rearward supporting member, a spring impact member intermediate the loop and secured at a point near its center to a point intermediate the ends of the forward side of the loop and at its ends to points near the ends of the rear side of the loop so as to permit relative longitudinal movement of the ends of said spring impact members when the loop is compressed.

Signed at Los Angeles, Calif. this 19th day of November, 1924.

ANDREW PHILLIP RIEDELE.